US011836782B2

(12) United States Patent
Mantha et al.

(10) Patent No.: US 11,836,782 B2
(45) Date of Patent: *Dec. 5, 2023

(54) PERSONALIZED ITEM RECOMMENDATIONS THROUGH LARGE-SCALE DEEP-EMBEDDING ARCHITECTURE WITH REAL-TIME INFERENCING

(71) Applicant: Walmart Apollo, LLC, Bentonville, AR (US)

(72) Inventors: Aditya Mantha, Sunnyvale, CA (US); Yokila Arora, Sunnyvale, CA (US); Shubham Gupta, Sunnyvale, CA (US); Praveenkumar Kanumala, Newark, CA (US); Stephen Dean Guo, Saratoga, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/466,277

(22) Filed: Sep. 3, 2021

(65) Prior Publication Data
US 2021/0398192 A1    Dec. 23, 2021

Related U.S. Application Data

(63) Continuation of application No. 16/777,571, filed on Jan. 30, 2020, now Pat. No. 11,113,744.

(51) Int. Cl.
*G06Q 30/00*   (2023.01)
*G06Q 30/0601*   (2023.01)
*G06F 16/9035*   (2019.01)

(52) U.S. Cl.
CPC ..... *G06Q 30/0631* (2013.01); *G06F 16/9035* (2019.01); *G06Q 30/0635* (2013.01); *G06Q 30/0641* (2013.01)

(58) Field of Classification Search
CPC ................................................ G06Q 30/06–08
See application file for complete search history.

(56) References Cited

U.S. PATENT DOCUMENTS 10,861,077 B1 * 12/2020 Liu ..................... G06Q 30/0631
11,113,744 B2 *  9/2021 Mantha ............... G06F 16/9035
(Continued)

FOREIGN PATENT DOCUMENTS

EP         1176531         1/2002
KR       20030068553       8/2003

OTHER PUBLICATIONS

Rebholz, Jenny S., "Alibaba Does AI," Design: Retail, 31.1: 24, Retrieved from https://dialog.proquest.com/professional/docview/2173639235?accountid=131444, Jan./Feb. 2019. 2019.
(Continued)

*Primary Examiner* — Ethan D Civan
(74) *Attorney, Agent, or Firm* — BRYAN CAVE LEIGHTON PAISNER LLP

(57) ABSTRACT

A method being implemented via execution of computing instructions configured to run at one or more processors and stored at one or more non-transitory computer-readable media. The method can include training two sets of item embeddings for items in an item catalog and a set of user embeddings for users, using a triple embeddings model, with triplets. The triplets each include a respective first user of the users, a respective first item from the item catalog, and a respective second item from the item catalog, in which the respective first user selected the respective first item and the respective second item in a respective same basket. The method also can include randomly sampling an anchor item
(Continued)

from a category of items selected by a user. The method additionally can include generating a list of complementary items using a query vector associated with the user and the anchor item. The query vector is generated for the user and the anchor item using the two sets of item embeddings and the set of user embeddings. Other embodiments are disclosed.

20 Claims, 9 Drawing Sheets

(56) References Cited

U.S. PATENT DOCUMENTS

| | | | | |
|---|---|---|---|---|
| 2002/0143613 | A1* | 10/2002 | Hong | G06Q 30/0601 705/26.1 |
| 2002/0188527 | A1 | 12/2002 | Dillard et al. | |
| 2006/0212362 | A1 | 9/2006 | Donsbach et al. | |
| 2017/0103050 | A9 | 4/2017 | Underwood et al. | |
| 2020/0104898 | A1* | 4/2020 | Cui | G06Q 30/0643 |

OTHER PUBLICATIONS

Barkan et al., "Item2Vec: Neural Item Embedding for Collaborative Filtering," 2016 IEEE International Workshop on Machine Learning for Signal Processing, Sep. 13-16, 2016, pp. 1-6, DOI: 10.1109/MLSP.2016.7738886, https://ieeexplore.ieee.org/document/7738886, 2016. 2016.

Grbovic et al., "E-Commerce in Your Inbox: Product Recommendations at Scale," Proceedings of the 21st ACM SIGKDD International Conference on Knowledge Discovery and Data Mining (KDD 2015), arXiv:1606.07154v1 [cs.AI], Jun. 23, 2016, pp. 1-10, https://arxiv.org/abs/1606.07154, 2016. 2016.

Mantha et al., "A Large-Scale Deep Architecture for Personalized Grocery Basket Recommendations," arXiv:1910.12757v2 [cs.IR], Nov. 13, 2019, https://arxiv.org/abs/1910.12757, pp. 1-5, 2019. 2019.

Hu et al., "Collaborative Filtering for Implicit Feedback Datasets," ICDM '08: Proceedings of the 2008 Eighth IEEE International Conference on Data Mining, Dec. 2008, vol. 1, pp. 263-272, https://doi.org/10.1109/ICDM.2008.22, 2008. 2008.

Wan et al., "Representing and Recommending Shopping Baskets with Complementarity, Compatibility and Loyalty," Proceedings of the 27th ACM International Conference on Information and Knowledge Management (CIKM '18), pp. 1133-1142, Oct. 22-26, 2018, 2018.

Liang et al., "Factorization Meets the Item Embedding: Regularizing Matrix Factorization with Item Co-Occurrence," RecSys '16: Proceedings of the 10th ACM Conference on Recommender Systems, Sep. 15-19, 2016, pp. 59-66, https://doi.org/10.1145/2959100.2959182, 2016. 2016.

Dong et al. "metapath2vec: Scalable Representation Learning for Heterogeneous Networks," 2017.

Linden et al., "Amazon. com Recommendations: Item-to-Item Collaborative Filtering," IEEE Internet Computing, vol. 7, No. 1, pp. 76-80, Jan. 2003, https://doi.org/10.1109/MIC.2003.1167344, 2003. 2003.

Le et al., "Basket-Sensitive Personalized Item Recommendation," Proceedings of the 26th International Joint Conference on Artificial Intelligence (IJCAI), Aug. 2017, pp. 2060-2066, https://dl.acm.org/doi/10.5555/3172077.3172174, 2017. 2017.

Mikolov et al., "Distributed Representations of Words and Phrases and Their Compositionality," Advances in Neural Information Processing Systems, arXiv:1310.4546v1 [cs.CL], Oct. 16, 2013, pp. 1-9, https://arxiv.org/abs/1310.4546, 2013. 2013.

Mikolov et al., "Efficient Estimation of Word Representations in Vector Space," arXiv preprint, arXiv:1301.3781v3 [cs.CL], Sep. 7, 2013, pp. 1-12, https://arxiv.org/abs/1301.3781, 2013. 2013.

Trofimov, "Inferring Complementary Products from Baskets and Browsing Sessions," arXiv preprint, arXiv:1809.09621v1 [cs.IR], Sep. 25, 2018, pp. 1-8, https://arxiv.org/abs/1809.09621, 2018. 2018.

Veit et al., "Learning Visual Clothing Style with Heterogeneous Dyadic Co-Occurrences," Proceedings of the 2015 IEEE International Conference on Computer Vision (ICCV), Dec. 7-13, 2015, pp. 4642-4650, https://doi.org/10.1109/ICCV.2015.527, 2015. 2015.

Zhang et al., "Quality-Aware Neural Complementary Item Recommendation," RecSys '18: Proceedings of the 12th ACM Conference on Recommender Systems, Sep. 2018, pp. 77-85, https://doi.org/10.1145/3240323.3240368, 2018. 2018.

Kang et al., "Complete the Look: Scene-Based Complementary Product Recommendation," 2019 IEEE/CVF Conference on Computer Vision and Pattern Recognition (CVPR), Jun. 15-20, 2019, pp. 10524-10533, doi: 10.1109/CVPR.2019.01078, https://doi.org/10.1109/CVPR.2019.01078, 2019. 2019.

Xu et al., "Modeling Complementary Products and Customer Preferences with Context Knowledge for Online Recommendation," arXiv:1904.12574v1 [cs.IR], Mar. 16, 2019, https://arxiv.org/abs/1904.12574v1, 2019. 2019.

McAuley et al., "Inferring Networks of Substitutable and Complementary Products," KDD '15: Proceedings of the 21st ACM SIGKDD International Conference on Knowledge Discovery and Data Mining, Aug. 10-13, 2015, pp. 785-794, https://doi.org/10.1145/2783258.2783381, 2015. 2015.

Mane et al., "Complementary-Similarity Learning Using Quadruplet Network," arXiv preprint, arXiv:1908.09928v2 [cs.LG], Sep. 14, 2019, https://arxiv.org/abs/1908.09928, 2019. 2019.

Abadi et al., "TensorFlow: A System for Large-Scale Machine Learning," 12th USENIX Symposium on Operating Systems Design and Implementation (OSDI '16), Nov. 2-4, 2016, pp. 265-283, https://www.usenix.org/conference/osdi16/technical-sessions/presentation/abadi, 2016. 2016.

Johnson et al., "Billion-Scale Similarity Search with GPUs," arXiv preprint, arXiv:1702.08734v1 [cs.CV], Feb. 28, 2017, https://arxiv.org/abs/1702.08734, 2017. 2017.

ANNOY library, https://github.com/spotify/annoy, accessed Jun. 18, 2020. 2020.

Naidan et al., "Non-Metric Space Library (NMSLIB) Manual," arXiv: 1508.05470v4 (cs.MS], Jun. 7, 2019, https://arxiv.org/pdf/1508.05470.pdf, 2019. 2019.

Boytsov et al., "Engineering Efficient and Effective Non-Metric Space Library," SISAP 2013: Proceedings of the 6th International Conference on Similarity Search and Applications, vol. 8199, pp. 280-293, Oct. 2013, https://doi.org/10.1007/978-3-642-41062-8_28, 2013. 2013.

"The Instacart Online Grocery Shopping Dataset 2017," https://www.instacart.com/ datasets/grocery-shopping-2017, accessed Jun. 18, 2020. 2020.

Walmart, "Grocery Home Shopping," http://grocery.walmart.com/, accessed Jun. 18, 2020. 2020.

Eclipse Deeplearning4j Development Team, "Deep Learning for Java: Open-Source Distributed Deep Learning for the JVM," Apache Software Foundation License 2.0., http://deeplearning4j.org, accessed Jun. 18, 2020. 2020.

\* cited by examiner

PERSONALIZED ITEM RECOMMENDATIONS THROUGH LARGE-SCALE DEEP-EMBEDDING ARCHITECTURE WITH REAL-TIME INFERENCING

CROSS-REFERENCE TO RELATED APPLICATION

This application is a continuation of U.S. application Ser. No. 16/777,571, filed Jan. 30, 2020. U.S. application Ser. No. 16/777,571 is incorporated herein by reference in its entirety.

TECHNICAL FIELD

This disclosure relates generally to providing personalized recommendations through large-scale deep-embedding architecture.

BACKGROUND

Item recommendations can assist a user when selecting items online. Online grocery shopping can be different from general merchandise online shopping, as grocery shopping is often highly personal, users often show both regularity in purchase types and purchase frequency, and users typically exhibit specific preferences for product characteristics, such as brand affinity for milk or price sensitivity for wine.

BRIEF DESCRIPTION OF THE DRAWINGS

To facilitate further description of the embodiments, the following drawings are provided in which.

Figure 1:
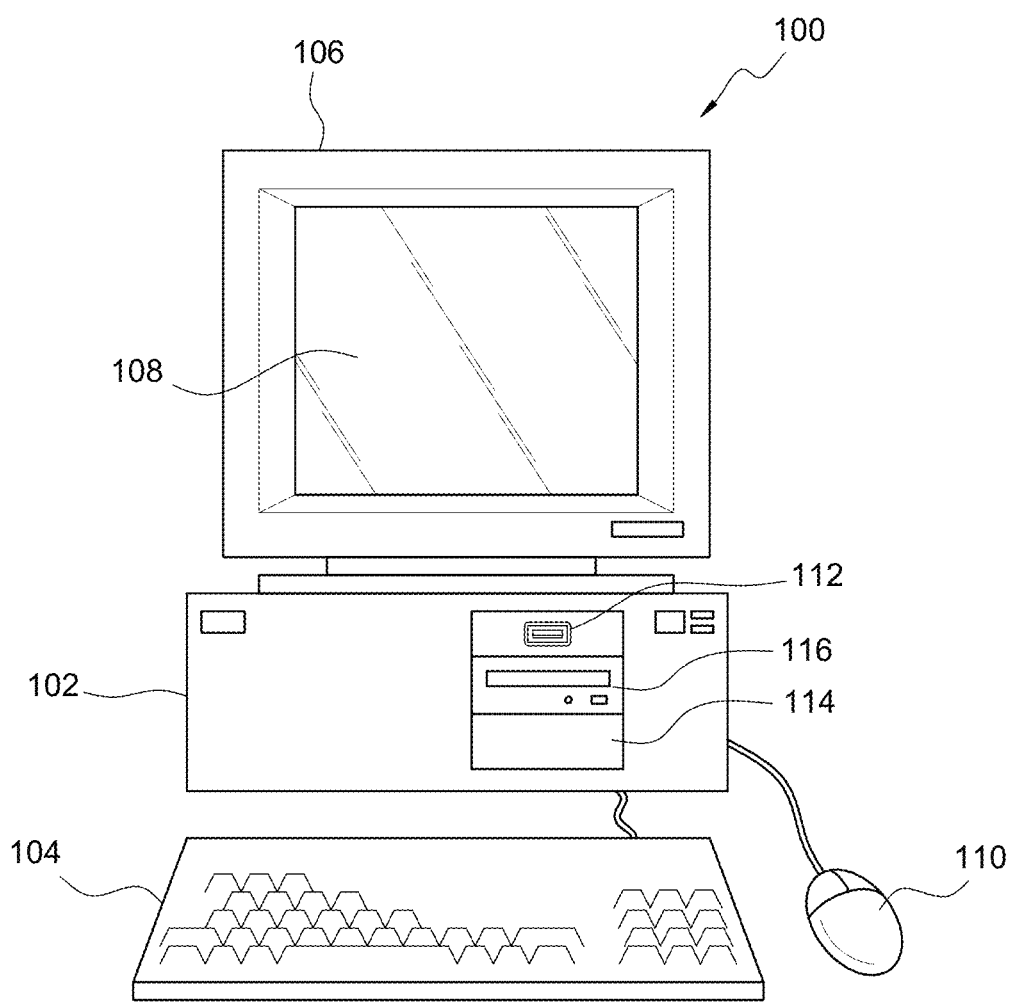
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.5 second, one second, or two seconds.

DESCRIPTION OF EXAMPLES OF EMBODIMENTS

Figure 2:
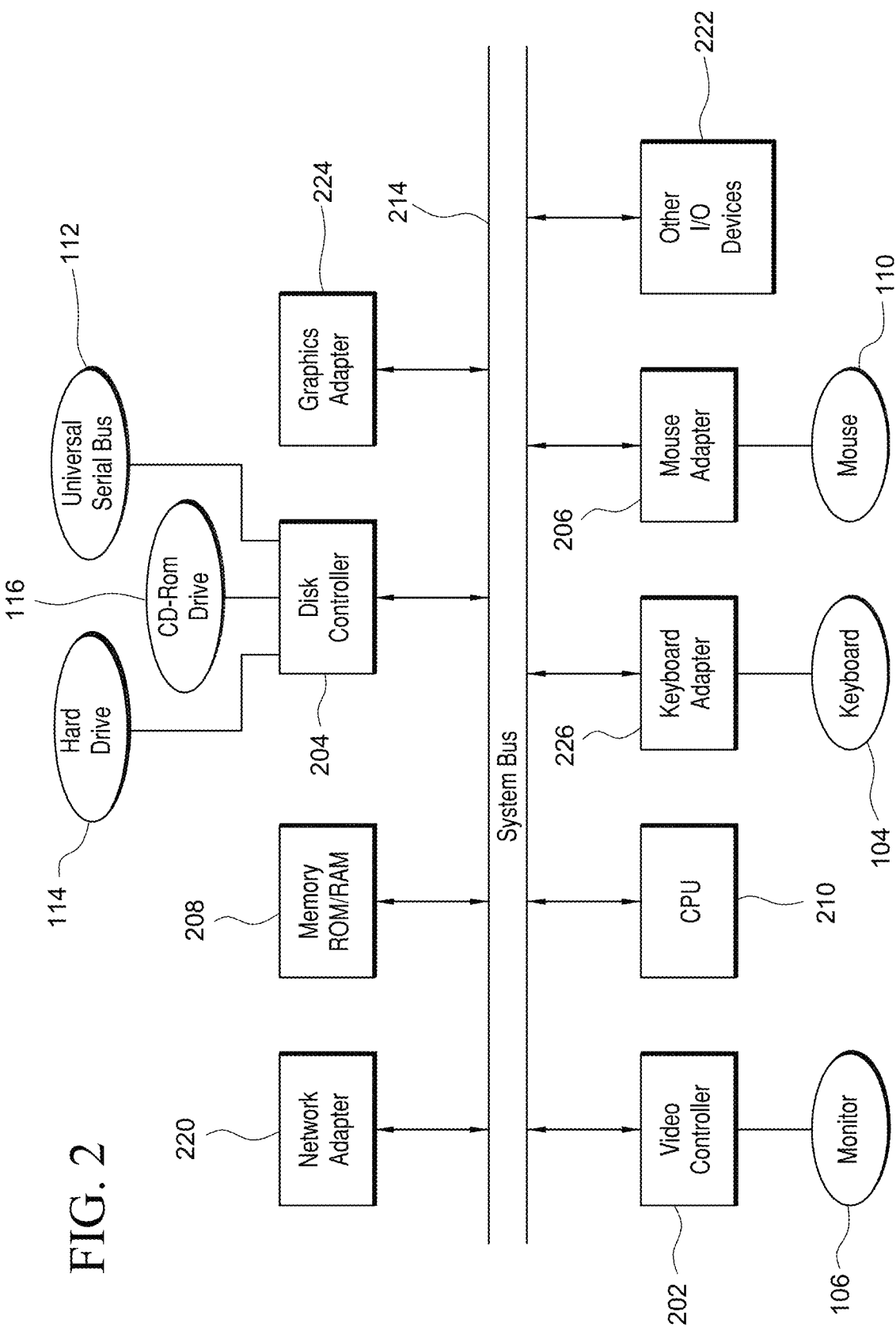
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
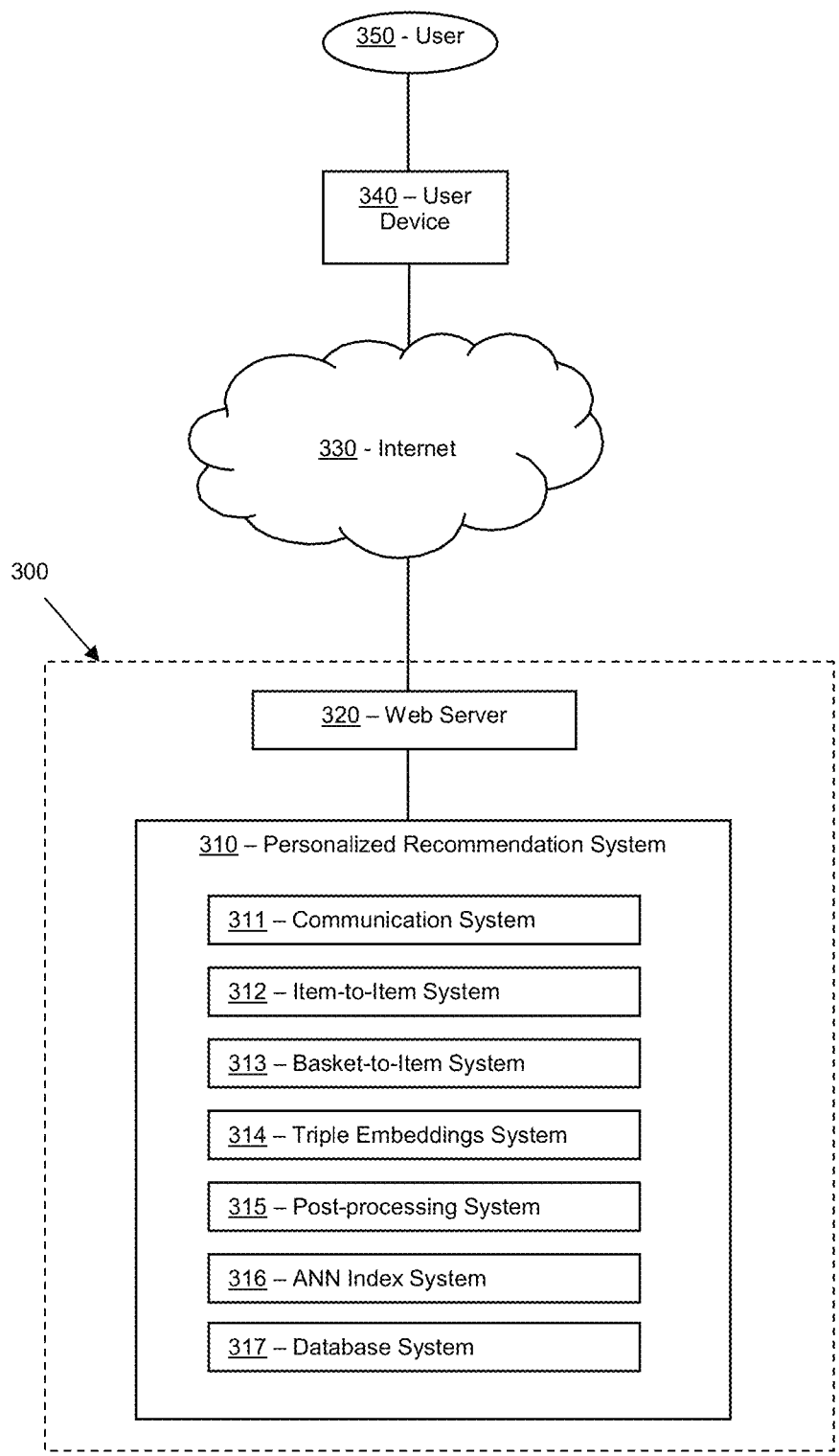
FIG. 3 illustrates a block diagram of a system that can be employed for providing personalized recommendations through large-scale deep-embedding architecture, according to an embodiment.

Turning ahead in the drawings, FIG. 3 illustrates a block diagram of a system 300 that can be employed for providing personalized recommendations through large-scale deep-embedding architecture, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a personalized recommendation system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Personalized recommendation system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host personalized recommendation system 310 and/or web server 320. Additional details regarding personalized recommendation system 310 and/or web server 320 are described herein.

In some embodiments, web server 320 can be in data communication through Internet 330 with one or more user devices, such as a user device 340. User device 340 can be part of system 300 or external to system 300. In some embodiments, user device 340 can be used by users, such as a user 350. In many embodiments, web server 320 can host one or more websites and/or mobile application servers.

For example, web server 320 can host a website, or provide a server that interfaces with a mobile application, on user device 340, which can allow users to browse and/or search for items (e.g., products), to add items to an electronic cart, and/or to purchase items, in addition to other suitable activities.

In some embodiments, an internal network that is not open to the public can be used for communications between personalized recommendation system 310 and web server 320 within system 300. Accordingly, in some embodiments, personalized recommendation system 310 (and/or the software used by such systems) can refer to a back end of system 300 operated by an operator and/or administrator of system 300, and web server 320 (and/or the software used by such systems) can refer to a front end of system 300, and can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, a mobile device, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, personalized recommendation system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to personalized recommendation system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of personalized recommendation system 310 and/or web server 320. In a similar manner, the processors and/or the non-transitory computer-readable media can be local and/or remote to each other.

Meanwhile, in many embodiments, personalized recommendation system 310 and/or web server 320 also can be configured to communicate with one or more databases, such as a database system 317. The one or more databases can include a product database that contains information about products, items, or SKUs (stock keeping units), for example, among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, personalized recommendation system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, personalized recommendation system 310 can include a communication system 311, an item-to-item system 312, a basket-to-item system 313, a triple embeddings system 314, a post-processing system 315, an approximate nearest neighbor (ANN) index system 316, and/or database system 317. In many embodiments, the systems of personalized recommendation system 310 can be modules of computing instructions (e.g., software modules) stored at non-transitory computer readable media that operate on one or more processors. In other embodiments, the systems of personalized recommendation system 310 can be implemented in hardware. Personalized recommendation system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host personalized recommendation system 310 and/or web server 320. Additional details regarding personalized recommendation system 310 and the components thereof are described herein.

In many embodiments, system 300 can provide item recommendations to a user (e.g., as customer) based on items that the user has included in a basket of selected items. These recommended items can be selected by the user to supplement the basket of the user. These item recommendations can be personalized to the user, based on personal preferences of the user. With growing consumer adoption of online grocery shopping through platforms such as Amazon Fresh, Instacart, and Walmart Grocery, it can be advantageous to provide relevant recommendations at one of more points of the shopping experience. Online grocery shopping is typically highly personal. Users often show both regularity in purchase types and purchase frequency, as well as exhibit specific preferences for product characteristics, such as brand affinity for milk or price sensitivity for wine.

In a number of embodiments, system 300 can provide a within-basket recommender, which can suggest grocery items that go well with the items in a shopping basket (e.g., cart) of the user, such as milk with cereals, or pasta with pasta sauce. In practice, users often purchase groceries with a particular intent, such as for preparing a recipe or stocking up for daily necessities. In several embodiments, the within-basket recommender can consider both (i) item-to-item compatibility within a shopping basket and (ii) user-to-item affinity, which together can advantageously generate complementary and relevant product recommendations that are actually user-personalized.

In many embodiments, a triple embeddings model can be trained and used for generating personalized recommendations. The triple embeddings model can be similar or identical to the triple2vec model described in Mengting Wan et al., "Representing and recommending shopping baskets with complementarity, compatibility and loyalty," in Proceedings of the 27th ACM International Conference on Information and Knowledge Management, ACM (Association of Computing Machinery), 2018, pp. 1133-1142, which is incorporated by reference herein in its entirety.

Figure 4:
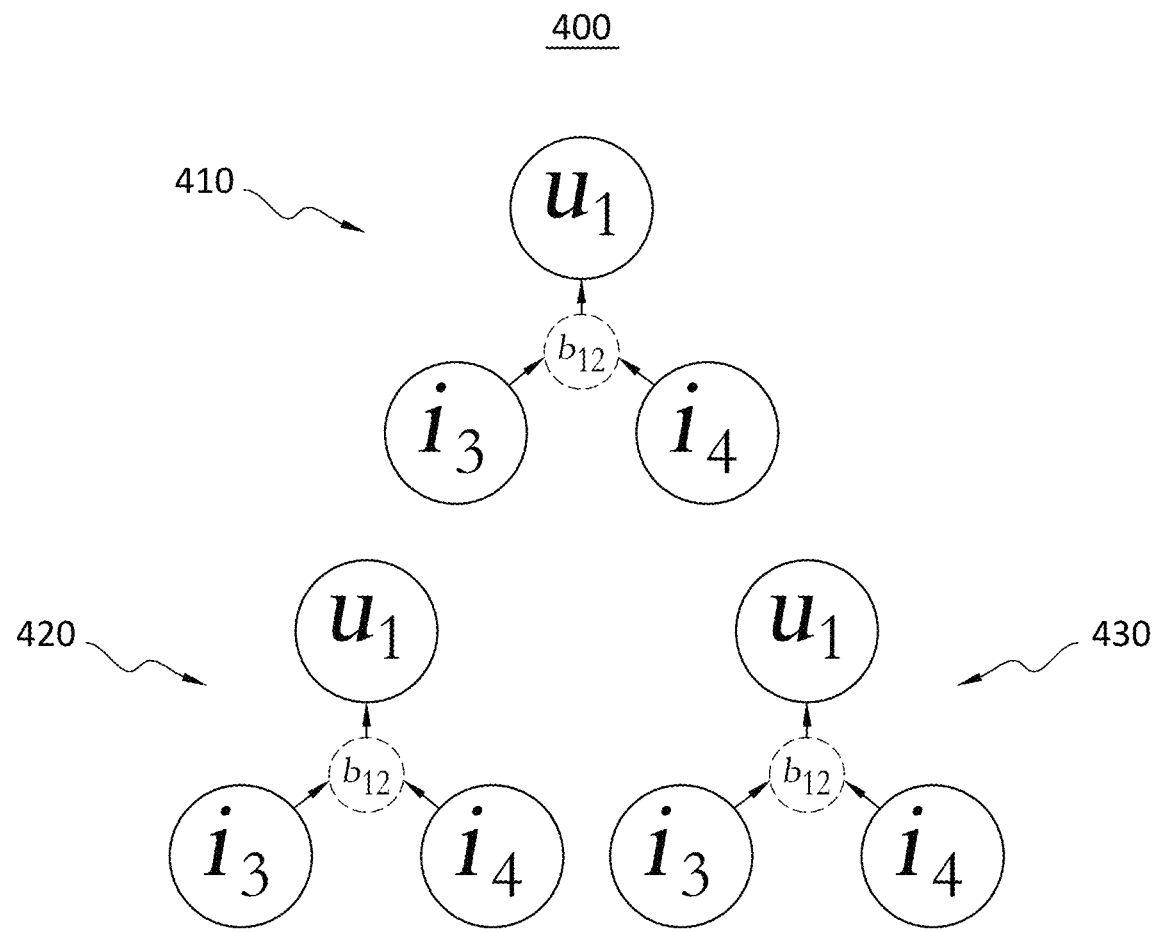
FIG. 4 illustrates a block diagram showing a triple embeddings model used to represent users, items, and baskets, based on a skip-gram framework.

Turning ahead in the drawings, FIG. 4 illustrates a block diagram 400 showing a triple embeddings model used to represent users, items, and baskets, based on a skip-gram framework, as described in Wan et al., supra. Item representation learning approaches based on a skip-gram framework generally seek to find item representations that are useful for predicting contextual (e.g., related) items or users, by defining different "context windows." These context windows can be implemented in various different instantiations on a heterogeneous graph, with nodes that represent items, users, or baskets.

As shown in FIG. 4, block diagrams 400 can include graphs 410, 420, and 430, each of which includes a user node for a user $u_1$, an item node for an item $i_3$, an item node for an item $i_4$, and a basket node for a basket $b_{12}$. Item-basket links represent the item being in the basket, such as item $i_3$ and item $i_4$ both being in $b_{12}$. User-basket links represent the user having selected (e.g., purchased) the basket, such as user $u_1$ having purchased basket $b_{12}$. The triple embeddings model thus uses triplets of (user, first item, second item), indicating that the first and second items were bought by the user in the same basket. The triple embeddings model can be trained, such that, given any two of the elements of the triplet, the third element of the triplet can be predicted. For example, graph 410 shows that user $u_1$ can be predicted given item $i_3$ and item $i_4$, graph 420 shows that item $i_4$ can be predicted given user $u_1$ and item $i_3$, and graph 430 shows that item $i_3$ can be predicted given user $u_1$ and item $i_4$.

In a number of embodiments, the triple embeddings model can be trained using past purchase data for users to derive embeddings that represent the users and the items from the triplets. For example, the triple embeddings model learns an embedding vector $h_u$ for the user u and a dual set of embedding vectors $(p_i, q_j)$ for the item pair (i, j). These embeddings can be modeled by taking a dot product between each of the embedding vectors, such that a cohesion score $s_{i,j,u}$ for a triplet can be defined as follows:

$$s_{i,j,u} = p_i^T q_j + p_i^T h_u + q_j^T h_u$$

where T represents the transpose of the vector. The cohesion score can capture both user-item compatibility through $p_i^T h_u$ and $q_j^T h_u$, and item-item complementarity through $p_i^T q_j$.

In several embodiments, the embeddings can be learned by maximizing the co-occurrence log-likelihood L (loss function) of each triplet, which is defined as follows:

$$L = \sum_{(i,j,u) \in T} (\log P(i|j,u) + \log P(j|i,u) + \log P(u|i,j))$$

where T is the set of triplets, P(i|j, u) is the softmax probability, defined as follows:

$$P(i|j,u) = \frac{e^{s_{i,j,u}}}{\sum_{i'} e^{s_{i',j,u}}}$$

and where P(j|i, u) and P(u|i, j) can be similarly obtained by interchanging (i, j) and (i, u), respectively. In many embodiments, the softmax function can be approximated by a Noise Contrastive Estimation (NCE) loss function, in accordance with many skip-gram models with negative sampling. A log-uniform (e.g., Zipf) distribution can be used to sample negative examples.

As an example, the triple embeddings model can be trained for the two sets of item embeddings (p, q) and the user embeddings (h) by randomly initializing a 128 dimension vector for each of these embeddings from a uniform distribution of [−0.01, 0.01]. After initialization, the triple embeddings models can be trained with an adaptive moment estimation optimizer, such as Adam, which is a variation of stochastic gradient descent (SGD), as follows:

$$m_w^{(t+1)} \leftarrow \beta_1 m_w^{(t)} + (1 - \beta_1) \nabla_w L^{(t)}$$

$$v_w^{(t+1)} \leftarrow \beta_2 v_w^{(t)} + (1 - \beta_2)(\nabla_w L^{(t)})^2$$

$$\hat{m}_w = \frac{m_w^{(t+1)}}{1 - (\beta_1)^{t+1}}$$

$$\hat{v}_w = \frac{v_w^{(t+1)}}{1 - (\beta_2)^{t+1}}$$

$$w^{(t+1)} \leftarrow w^{(t)} - \eta \frac{\hat{m}_w}{\sqrt{\hat{v}_w} + \epsilon}$$

where $w^{(t)}$ are the parameters of the model, is the co-occurrence log-likelihood loss function described above, $\beta_1$ and $\beta_2$ are forgetting factors for the gradients and second moments of the gradients, $\eta$ is a learning rate, and t is a time step. As an example, the triple embeddings model can be trained end-to-end for 100 epochs using 500 million triplets, using a past purchase data set over a one year time frame with 800 million user-item interactions, with 3.5 million users, and 90 thousand items, in which frequency threshold-based user level and item level filters were used to remove cold start users and items from the training.

Once the triple embeddings model is trained, matrix P and matrix Q can store the two sets of trained item embeddings for the catalog of items, such that matrices P and Q are each real-valued matrices having a number of rows equal to the number of items in the item catalog (which can be limited to not include cold start items, as described above) and a number of columns equal to the dimension of the embedding vector, such as 128, as described above. Matrix H can store the trained user embeddings for the users, such that matrix H is a real-valued matrix having a number of rows equal to the number of users and a number of columns equal to the dimension of the embedding vector, such as 128, as described above.

For a given "anchor" item j and a given user u, as inputs, the trained item matrices P and Q and trained user matrix H can be used to compute the cohesion score for each of the items i, to determine a score that indicates how complementary item i is to anchor item j for user u. For example, consider a simplified 32-dimension example in which the trained user embedding vector $h_u$ in matrix H for user u is as follows:

[0.32738936, 0.47486708, −0.44018468, −1.0137466, 0.4358432, −0.21896638, −1.1607007, 0.3042493, 0.48715204, 0.7864144, −0.8422068, 0.2846775, −1.0895154, 0.40973258, −0.13478273, 0.38279486, −0.56316096, −0.6631576, 0.4856452, 0.06135664, −0.49751332, −0.42942294, −0.6039675, −0.9324385, −0.01547593, 0.959067, 0.5826312, −0.1542099, −0.2449495, −0.6153408, −0.05710425, 0.4830378];

the trained item embedding vector $p_i$ in matrix P for item i is as follows:

[−0.3057416 0.07774266 0 803581 0.72900647 0.09258661 0.02778588 0.2705059 −0.07434104 −0 08514664 −0.33368888 0.25841185 0.530672 0.23466173 0.17158407 0.4228771 −0.6867255 0.24365486 0.3469819 −0.20994641 0.4170019 −0 17914794 0.13667138 −0.02210519 0.37313864 0.40211987 −0.2390854 0 4869946 0.34046495 −0.568138 0.5706644 −0.11231046 −0.2386148];

and the trained item embedding vector $q_j$ in matrix Q for anchor item j is as follows:

[−0.48197877 −0.47216713 0.7691373 0.31753355 −0.34225956 0.07289084 0.71213585 −0.19382164 0.2557742 −0.6527458 0.07196312 0.02975366 0.06880591 −0.38648534 0.3167588 0.16804916 0.4228312 0.38767454 −0.86445206 0.03228619 −0.31139407 0.40430707 −0.41132057 0.20389684 −0.18048657 −0.91251445 0.13429038 0.595438 −0.02878908 0.4773644 −0.27105173 0.14990729].

The cohesion score can be calculated, as follows:

$$s_{i,j,u} = p_i^T q_j + p_i^T h_u + q_j^T h_u = -5.4485517.$$

In many embodiments, for the anchor item j and user u, given as inputs, the top k complementary items (i) can be determined as outputs by iterating through the items (i) in matrix P and computing the cohesion score, and selecting the top k items (i). This approach can be described as follows:

$$\underset{i}{\mathrm{argmax}}(p_i^T q_j + p_i^T h_u + q_j^T h_u)$$

for the top k items, which k can be set as a design parameter. As an example, k can be set to 15 to determine the top 15 complementary items (i), given anchor item j and user u. The triple embeddings model can advantageously be used to recommend one or more items (i) that are personalized for a user, when the user (u) has selected an anchor item (j), which can be referred to as an item-to-item model.

In several embodiments, the item-to-item model additionally can include a complementary category filtering technique, which can filter out items that are recommended due to being popular overall items. For example, in online grocery shopping, bananas, milk, eggs, and bath tissue are very popular items. These items would often be included as recommendations from the item-to-item model, merely due to their popularity in most carts, despite not being particularly complementary to a given anchor item j, such as specific type of dry pasta, for a particular user u.

In many embodiments, the complementary category filtering technique can be based on subcategories that are complementary to the subcategory of the anchor item. In a number of embodiments, each item in the item catalog can include an item taxonomy, which can include at least the following four levels: Level 1 (L1) for Super Department, Level 2 (L2) for Department, Level 3 (L3) for Category, and Level 4 (L4) for Sub-category. For example, a specific item having item title "Great Value Vitamin D Whole Milk," can have L1 of "Eggs & Dairy," L2 of "Milk", L3 of "Dairy Milk," and L4 of "Whole Milk." The complementary category filtering technique can be performed at the L4 subcategory level, by considering other subcategories that are complementary to the subcategory of the anchor item, and boosting the scores for items in those subcategories. In several embodiments, the complementary category filtering technique can involve calculating support and lift metrics, as follows:

Support $(A)$ = fraction of all transactions that contain the item $A$.

$$\mathrm{Lift}\,(A \to B) = \frac{\mathrm{Support}\,(A \cup B)}{\mathrm{Support}\,(A) \times \mathrm{Support}\,(B)}$$

where A is a given anchor item, and B is an item to be recommended from anchor item A, denoted as (A→B). When B is popular item, but unrelated to anchor item A, the lift metric will be low. When B is complementary to A, but not merely popularly co-bought, the lift metric will be high.

Using these lift scores, other subcategories that are complementary to the subcategory of the anchor item can be determined, based on the lift metrics for one or more of the items in the other subcategories. For a given anchor item j, such as specific type of dry pasta, the item (L1/L2/L3/L4) taxonomy can be as follows: (Pantry/Pasta & Pizza/Dry Pasta/Dry Pastas). Using the lift scores, complementary subcategories, based on the top 10 lift scores, can be determined to be as follows:

1. Pantry/Pasta & Pizza/Pasta Sauce/Pasta & Pizza Sauces
2. Eggs & Dairy/Cheese/Shredded Cheese/Mozzarella Cheeses
3. Pantry/Soup/Broth, Stocks & Bouillon/Stocks, Broth
4. Pantry/Rice, Grains & Dried Beans/Rice/Rice Mixes
5. Pantry/Soup/Ready to Eat/Veggie Soups
6. Pantry/Soup/Ready to Eat/Meat & Seafood Soups
7. Pantry/Pasta & Pizza/Macaroni & Cheese/Pasta Mixes
8. Pantry/Rice, Grains & Dried Beans/Rice/Rice
9. Pantry/Soup/Ramen & Dry Soup Mix/Ramen & Udon
10. Meat/Beef/Ground Beef & Patties/Fresh In many embodiments, the lift scores approach can determine items that are complementary and related more accurately than using co-bought scores. Using co-bought scores instead for the dry pasta anchor item would have found many popular but unrelated subcategories, such as Eggs, Bananas, Low-Fat Milk, Bath Tissue, and Whole Milk.

In some embodiments, the complementary category filtering technique can involve applying the lift scores to the complementary items, such that truly complementary items are boosted more, while popular yet unrelated items are boosted less, such that these latter items can drop lower in the score ranking and be effectively filtered out.

In many embodiments, this item-to-item model can be used to recommend personalized items for user u when given an anchor item j, such that the recommended items are complementary to each other and not unrelated popular co-bought items. For example, for a specific anchor item having item title "Swiffer Sweeper Wet Mopping Cloths, Open-Window Fresh, 24 count," and having (L1/L2/L3) taxonomy of (Household Essentials/Cleaning Tools/Brooms, Mops & Brushes), the item-to-item model can recommend the items shown below in Table 1:

TABLE 1

| Item Title | L1-Super Department | L2-Department | L3-Category |
|---|---|---|---|
| Angel Soft Toilet Paper, 12 Jumbo Rolls | Household Essentials | Paper Products | Bath Tissue |
| Great Value Everyday Strong Printed Paper Towels, 3 Big Rolls | Household Essentials | Paper Products | Paper Towels |
| Clorox Clean-Up All Purpose Cleaner with Bleach, Spray Bottle, Fresh Scent, 32 ounce (oz) | Household Essentials | Cleaning Products | All Purpose Cleaners |
| Downy Ultra Liquid Fabric Conditioner, April Fresh, 105 Loads 90 fluid oz | Household Essentials | Laundry | Fabric Softeners |
| all with Stainlifters Free Clear Liquid Laundry Detergent, 123 Loads, 184.5 oz | Household Essentials | Laundry | Detergents |
| Great Value Ultra Strong Paper Towels, Split Sheets, 6 Double Rolls | Household Essentials | Paper Products | Bath Tissue |
| Great Value Everyday Strong Printed Paper Towels, 8 Count | Household Essentials | Paper Products | Paper Towels |
| Lysol All Purpose Cleaner Spray, Lemon Breeze, 32 oz | Household Essentials | Cleaning Products | All Purpose Cleaners |
| Bounce Dryer Sheets, Outdoor Fresh, 80 Count | Household Essentials | Laundry | Fabric Softeners |
| Gain Aroma Boost Liquid Laundry Detergent, Original | Household Essentials | Laundry | Detergents |

With a single item selected by the user, the item-to-item model thus can provide a list of complementary item recommendations that are personalized to the user. Often, especially in the online grocery shopping context, baskets often have more than one item, and often have many items. In several embodiments, a basket-to-item model can be used to provide personalized item recommendations, given a basket of items selected by a user. In many embodiments, the basket-to-item model can use the item-to-item model described above, as described below in further detail.

Figure 5:
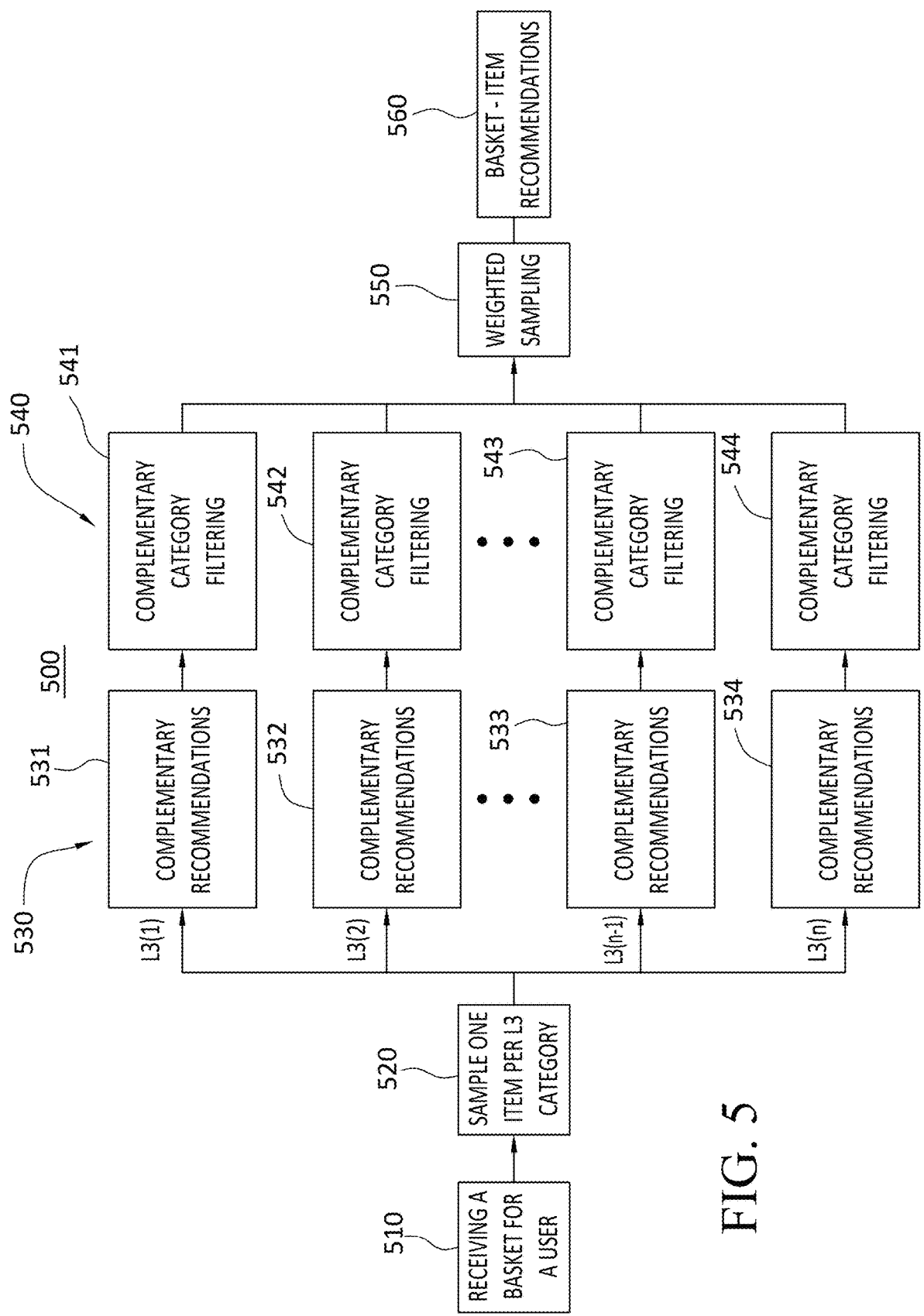
FIG. 5 illustrates a flow chart for a method, according to an embodiment.

Turning ahead in the drawings, FIG. 5 illustrates a flow chart for a method 500, according to an embodiment. In some embodiments, method 500 can be a method of providing personalized item recommendations from a basket of items for a user, which can be referred to as a basket-to-item model. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3), personalized recommendation system 310 (FIG. 3), and/or web server 320 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 500 and other blocks in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, method 500 can include a block 510 of receiving a basket for a user. In many embodiments, the basket (e.g., virtual cart) can include items that have been selected by the user, which can be referred to as "basket items." For example, a user can select a number of items in an online grocery shopping system, and then choose to initiate a checkout process. The user can be presented with a stock-up page, which can include other items that are recommended for the user to purchase. In many embodiments, the items recommended on the stock-up page can be determined using a basket-to-item model, as described below in further detail.

In a number of embodiments, method 500 can continue with a block 520 of sampling one item per category (e.g., L3 category). In many embodiments, each item in the basket can be grouped by the L3 category, which can be denoted as L3 (1), L3 (2), . . . L3 (n−1), L3 (n), when there are n L3 categories that are grouped from among the items in the basket. In several embodiments, a single item can be randomly sampled from each of the L3 categories, and this randomly sampled item can be denoted as the anchor item for the L3 category. In some embodiments, if an item does not have an L3 category in its item taxonomy, then such item can be filtered out from the category grouping process.

In several embodiments, method 500 can continue with a group of blocks 530 of generating complementary item recommendations, which can include individual instances for each of the L3 categories, such as blocks 531-534. In many embodiments, each of blocks 531-534 can involve generating complementary item recommendations using the two sets of trained item embeddings and trained user embeddings from the triple embeddings model, as described above. For example, at block 531, the anchor item for category L3 (1) can be the given anchor item j described above, and the user can be the user u described above, such that the trained embeddings can be used to generate a list of top k complementary item (i) recommendations, as described above. Blocks 532-534 can generate complementary item recommendations similarly for their respective anchor items. In many embodiments, each of blocks 531-534 can be performed in parallel. In some embodiments, if no complementary item recommendations are generated for an anchor item in an L3 category, then a separate anchor item can be selected from that L3 category, such as another random selection, and complementary item recommendations can be generated for the newly selected anchor item in that L3 category.

In a number of embodiments, method 500 can continue with a group of blocks 540 of performing a complementary category filtering, which can include individual instances for each of the L3 categories, such as blocks 541-544. In many embodiments, each of blocks 541-544 can involve performing a complementary category filtering using the list of complementary item recommendations generated in blocks 531-534, respectively. For example, at block 541, the list of complementary item recommendations generated at block 531 can be filtered to remove popular co-bought items having subcategories that are unrelated to the subcategory of the anchor item, as described above. Blocks 542-544 can perform a complementary category filtering similarly for their respective lists of complementary item recommendations. In many embodiments, each of blocks 541-544 can be performed in parallel. Each respective pair of blocks 531 and 541, blocks 532 and 542, blocks 533 and 543, and blocks 534 and 544 can be an instance of using the item-to-item model described above, which can generate lists of complementary items for the anchor items randomly sampled in block 520.

In a number of embodiments, method 500 can continue with a block 550 of performing a weighted sampling. In many embodiments, for each of the L3 categories, a respective quantity of items from the respective list of the complementary items can be sampled (e.g., randomly selected) proportional to a respective quantity of the basket items in the respective L3 category grouping with respect to a total quantity of the basket items. In several embodiments, the number of recommended items sampled for a L3 category can be calculated by multiplying the number of basket items in the L3 category by the number of total recommendations to present to the user, divided by the total number of basket items in the basket.

As an example, there can be 8 items in the basket that was selected by a user, such as 3 items in a first L3 category of "Canned Vegetables," 3 items in a second L3 category of "Pasta Sauce," 1 item in a third L3 category of "Broth, Stocks & Bouillon," and 1 item in a fourth L3 category of "Sports & Vitamin Drinks." If the total number of item recommendations that will be generated for the basket is 40, then the number of item recommendations sampled for each of the first two L3 categories can be 15, which is ⅜ of 40, and the number of item recommendations sampled for each of the last two L3 categories can be 5, which is ⅛ of 40. In another embodiment, the number k in the request for the top k items requested in each of blocks 531-534 can be varied based on the proportion of items in each L3 category.

In a number of embodiments, method 500 can continue with a block 560 of outputting a list of item recommendations for the basket. The item recommendations sampled in block 550 can be merged across all the L3 categories (e.g., L3 (1) through L3 (n)). When merging, if the same item is included in lists of item recommendations, the instance having the highest score can be included in the merged list. In many embodiments, the list of item recommendations provided by the basket-to-item model can be personalized to the user based on items that are in the basket in a manner that considers more than just individual items in the basket.

Figure 6:
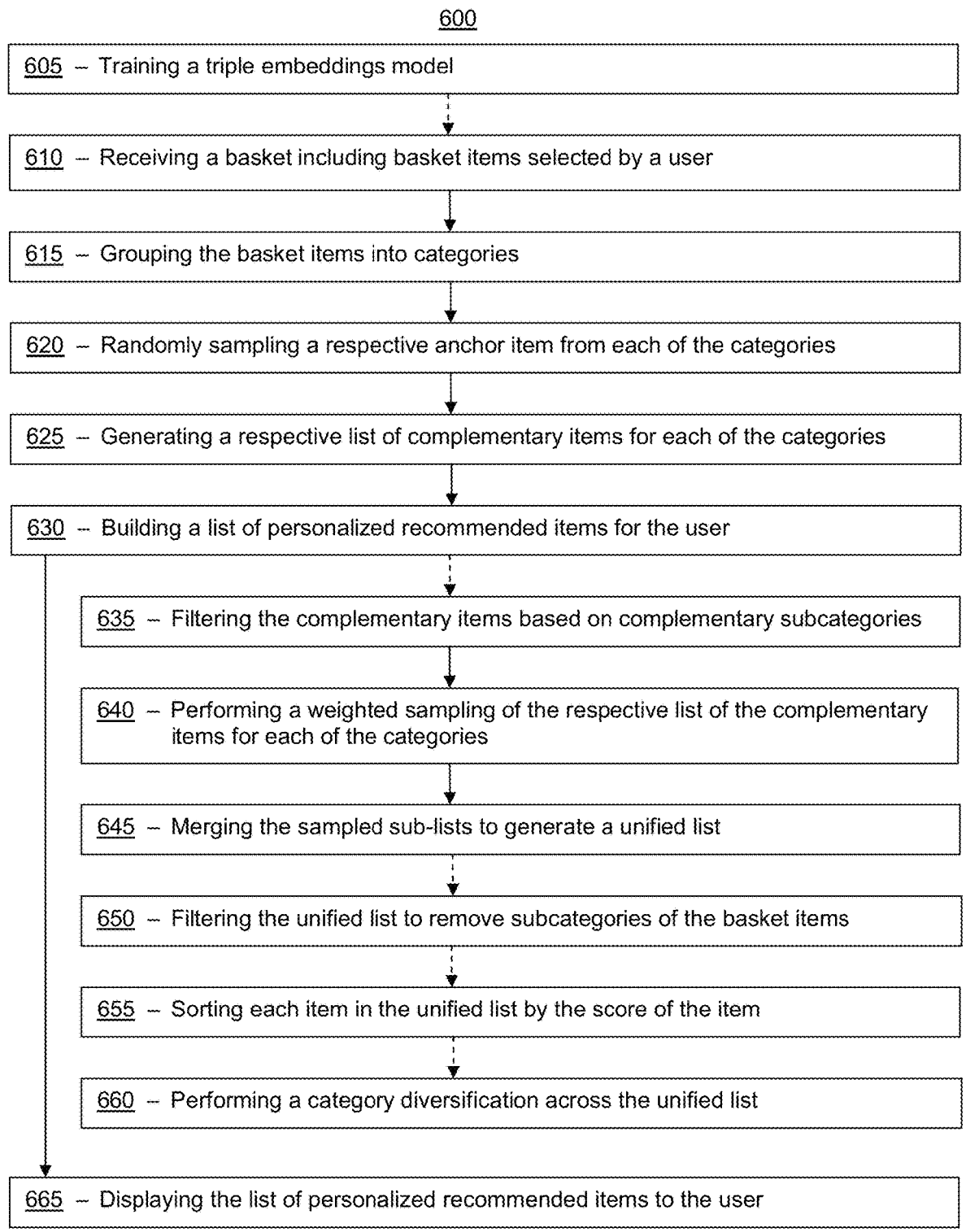
FIG. 6 illustrates a flow chart for a method, according to another embodiment.

Turning ahead in the drawings, FIG. 6 illustrates a flow chart for a method 600, according to another embodiment. In some embodiments, method 600 can be a method of providing personalized recommendations through large-scale deep-embedding architecture. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped. Method 600 can be similar to method 500 (FIG. 5), and various activities of method 600 can be similar or identical to various activities of method 500 (FIG. 5).

In many embodiments, system 300 (FIG. 3), personalized recommendation system 310 (FIG. 3), and/or web server 320 (FIG. 3) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 600 and other blocks in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 optionally can include a block 605 of training a triple embeddings model with triplets using an adaptive moment estimation optimizer to optimize a co-occurrence log-likelihood of each of the triplets. In many embodiments, the triple embeddings model can be similar or identical to the triple embeddings model described above, such as triple2vec. In some embodiments, the triple embeddings model can be trained as describe above, based on past purchase history, using triplets of (user, first item, second item), in which the first item and the second item were selected (e.g., purchased) in the same basket by the user. In several embodiments, the training for the triple embeddings model can be performed offline prior to using the model. Once trained, the triple embeddings model can be used for a period of time to provide personalized item recommendations to many users. In a number of embodiments, the triple embeddings model can be retrained and/or updated periodically, such as weekly, or another suitable time period, to be updated with the latest purchase history.

In several embodiments, method 600 also can include a block 610 of receiving a basket comprising basket items selected by a user from an item catalog. Block 610 can be similar to block 510 (FIG. 5). The user can be similar or identical to user 350 (FIG. 3). As described above in connection with block 510 (FIG. 5), the basket can include items that have been selected by the user for purchase, referred to as "basket items." For example, the user can select a number of items in an online grocery shopping system, and can initiate a checkout process.

In a number of embodiments, method 600 additionally can include a block 615 of grouping the basket items of the basket into categories based on a respective item category of each of the basket items. In many embodiments, the item categories can be one of the categorization levels in an item taxonomy, such as the item taxonomy described above. For example, the item categories can be L3 categories, as described above. In various embodiments, each of the categories can be a group in which each of the items in the group has the same item category.

In several embodiments, method 600 further can include a block 620 of randomly sampling a respective anchor item from each of the categories. In many embodiments, the anchor item can be one of the basket items in the category, chosen at random. For example, in a first category in which there are three basket items, the anchor item can be one of the three basket items, randomly selected. The random sampling of anchor items can be performed for each of the categories created in block 615. Blocks 615 and 620 can be similar to block 520 (FIG. 5).

In a number of embodiments, method 600 additionally can include a block 625 of generating a respective list of complementary items for the respective anchor item for the each of the categories based on a score for each of the complementary items generated using two sets of trained item embeddings for items in the item catalog and using trained user embeddings for the user. Block 625 can be similar to group of blocks 530 (FIG. 5). The two set of trained item embeddings can be similar to the item embeddings stored in matrices P and Q, described above. The trained user embeddings for the user can be similar to $h_u$ described above, which can be stored in matrix H, described above. The score can be similar or identical to the cohesion score, described above. The items in the list of complementary items can be a top k items based on the given anchor item and the user, as described above.

In many embodiments, the two sets of trained item embeddings and the user embeddings were trained using the triple embeddings model in block 605 with triplets. The triplets can each include a respective first user of users, a respective first item from the item catalog, and a respective second item from the item catalog, in which the respective first user selected the respective first item and the respective second item in a respective same basket. In a number of embodiments, a vector dimension for (i) the trained user embeddings for the user and (ii) for each item in each of the two sets of trained item embeddings can be 128. In other embodiments, a different dimension can be used for the embedding vectors.

In several embodiments, method 600 further can include a block 630 of building a list of personalized recommended items for the user based on the respective lists of the complementary items for the categories. In many embodiments, the lists of complementary items for the categories that were generated in block 625 can be used to build the list of personalized recommended items for the user.

In a number of embodiments, block 630 optionally can include a block 635 of filtering the respective list of the complementary items for the each of the categories based on complementary subcategories. Block 635 can be similar to group of blocks 540 (FIG. 5). In several embodiments, filtering the respective list of complementary items can include receiving lift scores for subcategories of the complementary item, and applying the lift scores for the complementary items to remove, from the respective list of the complementary items, popular co-bought items in the subcategories that are unrelated to a subcategory of the respective anchor item for the each of the categories. The subcategories can be similar to the L4 subcategories described above. The lift scores can be similar to the lift scores described above.

In several embodiments, block 630 also can include a block 640 of performing a weighted sampling of the respective list of the complementary items for the each of the categories to generate a sampled sub-list of the list of the complementary items for the each of the categories. Block 640 can be similar to block 550 (FIG. 5). In several embodiments, block 640 can include, for the each of the categories, sampling a respective quantity of items from the respective list of the complementary items proportional to a respective quantity of the basket items in the each of the categories with respect to a total quantity of the basket items in the basket.

In a number of embodiments, block 630 additionally can include a block 645 of merging the sampled sub-lists for the categories to generate a unified list. For example, the unified list can be a union of the sampled sub-lists created in block 640. In some embodiments, if the same item is in more than one of the sampled sub-lists, the item can be included once in the unified list, but the score of the item used can be the highest score of that item based on the different cohesion scores generated for that item across the different categories in which it was recommended for different anchor items.

In several embodiments, block 630 optionally can include a block 650 of filtering out items from the unified list, in which such filtered-out items have subcategories that are identical to subcategories of the basket items. For example, if a basket item in the basket has an L4 subcategory of "Canned Corn," then items in the unified list that have that same L4 subcategory of "Canned Corn" can be removed from the unified list, so that the remaining items in the unified list will not be too similar to what is already in the basket.

In a number of embodiments, block 630 further optionally can include a block 655 of sorting each item in the unified list by the score of the item. The score of the item can be the cohesion score determined for each recommended item in block 625, which in some embodiments, was adjusted based on the lift scores.

In several embodiments, block 630 further optionally can include a block 660 of performing a category diversification across the unified list. In many embodiments, the unified list can be grouped into carousels of recommended items, such as groups of 5 recommended items. In a number of embodiments, each carousel includes no more than one item of any item category. For example, if there are multiple items in the unified list that have item category of "Fabric Softeners," only one of those items will be included in each carousel. In many embodiments, the carousels can be presented in a round robin fashion. The category diversification can prevent recommending very similar items to the user at the same time.

In a number of embodiments, method 600 additionally can include a block 665 (after block 630) of sending instructions to display at least a portion of the list of personalized recommended items to the user. As an example, the display can occur on a user interface of an electronic device. The list of personalized item recommendations can be the unified list. In some embodiments, the entire list of personalized item recommendations can be displayed to the user, either all at once or in portions, such as in carousels that are presented round robin to display the entire list in segments. In other embodiments, only a portion of the list of personalized item recommendations can be displayed to the user. For example, the top 10 items in the list can be displayed to the user, although the list of personalized item recommendations can include more items, such as 40 items. In many embodiments, the list of personalized item recommendations or portion thereof can be displayed on a stockup page that is presented to the user once the user initiates a checkout process. The list of personalized item recommendations can include items that are complementary to the items already in the basket and personalized to be compatible with the preferences of the user, as learned through the triple embeddings model.

Figure 7:
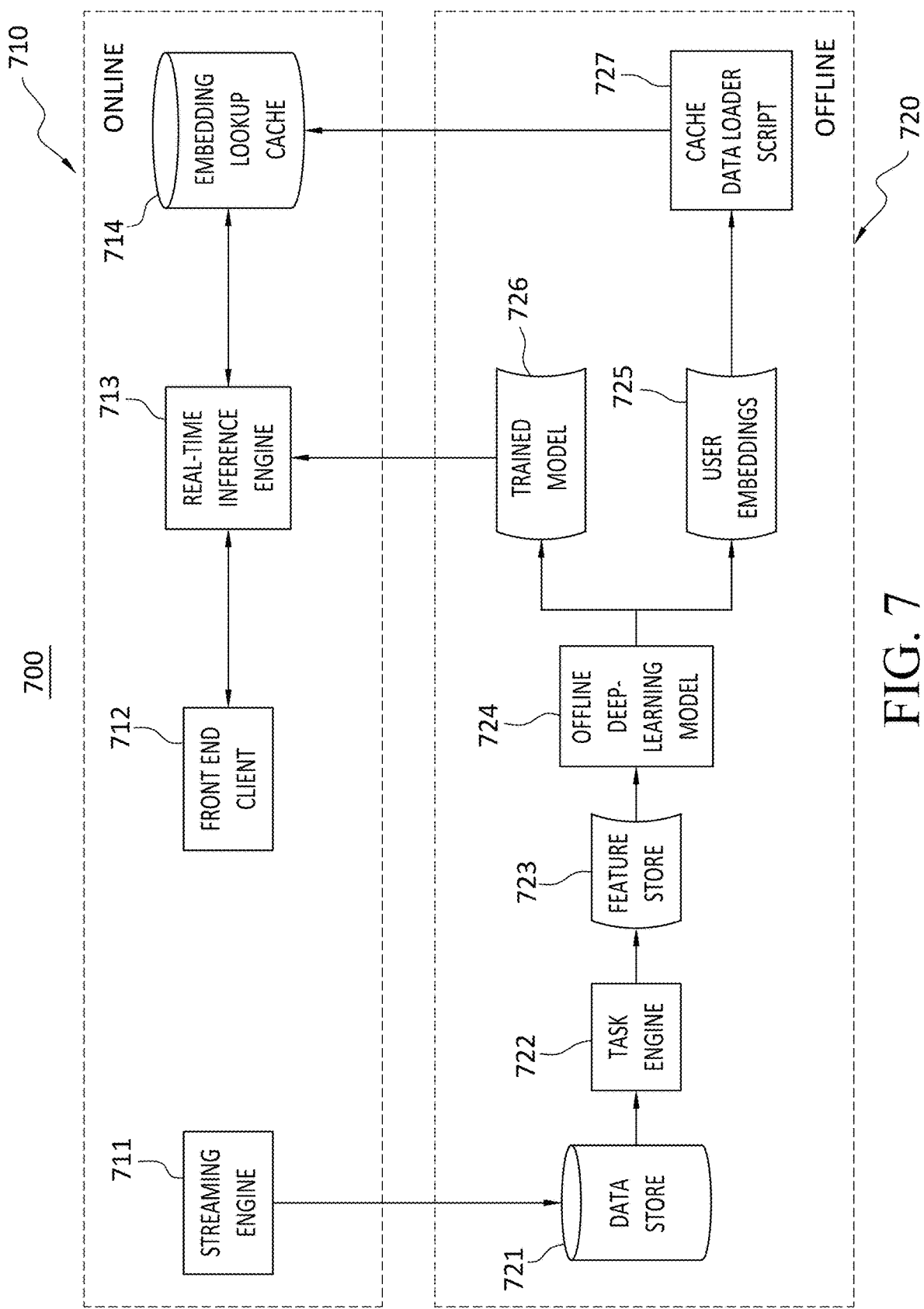
FIG. 7 illustrates a block diagram of a system that can be employed for providing personalized recommendations through large-scale deep-embedding architecture, according to another embodiment.

Turning ahead in the drawings, FIG. 7 illustrates a block diagram of a system 700 that can be employed for providing personalized recommendations through large-scale deep-embedding architecture, according to another embodiment. System 700 is merely exemplary and embodiments of the system are not limited to the embodiments presented herein. The system can be employed in many different embodiments or examples not specifically depicted or described herein. In some embodiments, certain elements, modules, or systems of system 700 can perform various procedures, processes, and/or activities. In other embodiments, the procedures, processes, and/or activities can be performed by other suitable elements, modules, or systems of system 700.

Generally, therefore, system 700 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 700 described herein.

System 700 can be similar to system 300 (FIG. 3), and various components of system 700 can be similar or identical to various components of system 300 (FIG. 3). In many embodiments, system 700 can be an implementation of system 300 (FIG. 3) that is adapted with a real-time inference method using approximate nearest neighbor (ANN) indexing. In order to provide personalized basket-to-item recommendations with limited latencies, system 700 can be employed.

In conventional production item-item or user-item recommendation systems, model recommendations are pre-computed offline via batch computation, and cached in a database for static lookup in real-time. This approach cannot be applied to basket-to-item recommendations, due to the exponential number of possible shopping baskets. Additionally, model inference time increases with basket size (e.g., number of items in the basket), which can increase latency.

The inference phase of the triple embeddings model (e.g., triple2vec) can be transformed into a similarity search of dense embedding vectors. For a given user u and anchor item j, this transformation can be achieved by adjusting the argmax of the cohesion score, as shown below:

$$\operatorname*{argmax}_{i}(p_i^T q_j + p_i^T h_u + q_j^T h_u) = \operatorname*{argmax}_{i}([\ P_i \quad P_i\ ]^T [\ q_j \quad h_u\ ])$$

The $q_j^T h_u$ term drops out of the argmax on the left side, as it is not based on i. The first term in the argmax on the right side, $[p_i\ p_i]^T$, can be the ANN index, as it only depends on i. The second term in the argmax on the right side, $[q_j\ h_u]$, is based on inputs u and j, and can be the query vector. The argmax problem thus can be transformed into a similarity search.

In some embodiments, another set of preference scores can be obtained by reversing $p_i$ and $q_j$ with $q_i$ and $p_j$, respectively. In many embodiments, the model performance can be improved by interchanging the dual item embeddings and taking the average of the cohesion scores, as follows:

$$\operatorname*{argmax}_{i}\left(\frac{(p_i^T q_j + p_i^T h_u + q_j^T h_u) + (q_i^T p_j + q_i^T h_u + p_j^T h_u)}{2}\right) =$$

$$\operatorname*{argmax}_{i}(p_i^T q_j + p_i^T h_u + q_i^T p_j + q_i^T h_u) =$$

$$\operatorname*{argmax}_{i}([\ p_i \quad p_i \quad q_i \quad q_i\ ]^T [\ q_j \quad h_u \quad p_j \quad h_u\ ])$$

The first term in the argmax on the right side, $[p_i\ p_i\ q_i\ q_i]^T$, the ANN index, as it only depends on i. The second term in the argmax on the right side, $[q_j\ h_u\ p_j\ h_u]$, is based on inputs u and j, and is the query vector.

In many embodiments, similarity search of the inference problem can be sped up by using a conventional ANN indexing library, such as Faiss, Annoy, or NMSLIB (Non-Metric Space Library) to perform approximate dot product inference efficiently at scale.

In many embodiments, generating top-k within-basket recommendations in production can include: (1) basket-anchor set selection, (2) model inference, and/or (3) post-processing. In some embodiments, basket-anchor set selection can include generating personalized within-basket recommendations by replacing the item embeddings $p_i$ and $q_i$ with the average embedding of all the items in the shopping basket. This approach works very well for baskets with smaller sizes, but in practice, a typical family's shopping basket of groceries contains dozens of items. Taking the average of such large baskets results in losing information about the individual items in the basket. For larger baskets, a sampling algorithm that randomly selects 50% of items in the basket as a basket-anchor set can be used. In other embodiments, a sampling approach similar or identical to the approach described in block 520 (FIG. 5) and/or block 620 (FIG. 6) can be used to select anchor items.

In several embodiments, model inference can include, for each item in the basket-anchor set, creating the query vector $[q_j\ h_u\ p_j\ h_u]$ using the pre-trained user embedding $h_u$ and item embeddings $p_i$ and $q_i$. The query vector can be used in the ANN index to retrieve the top-k recommendations. The ANN index can be created from the concatenation of the dual item embeddings $[p_i\ p_i\ q_i\ q_i]$ for all i. The ANN index and embeddings can be stored in memory for fast lookup. In practice, the inference can be further sped up by performing a batch lookup in the ANN index instead of performing a sequential lookup for each item in the basket-anchor set. In many embodiments, k can be set to 30, such that the top 30 nearest neighbors. In other embodiments, another suitable value can be pre-selected, or another the value can be set variably customized based on one or more factors.

After the top-k recommendations are retrieved for each anchor item in the basket-anchor set, a recommendation aggregator system can be used to blend all the recommendations together. The aggregator can use several factors such as number of distinct categories in the recommendation set, the individual item scores in the recommendations, taxonomy-based weighting, and business rules to merge the multiple recommendation sets, and filter to a top-k recommendation set. Once the top-k recommendation set is generated, an additional post-processing layer can be applied. This layer can incorporate diversification of items, remove blacklisted items and categories, utilize market-basket analysis association rules for taxonomy-based filtering, and/or apply various business requirements to generate the final top-k recommendations for production serving.

As shown in FIG. 7, system 700 can be used to implement this within-basket real-time recommendation system using ANN embedding retrieval. System 700 can include online components 710 and offline components 720. Online components 710 can include a distributed streaming engine 711, a front-end client 712, a real-time inference engine 713, and/or an embedding lookup cache 714. Offline components 720 can include a data store 721, a task engine 722, a feature store 723, an offline deep-learning model 724, user embeddings 725, trained model 726, and/or cache data loader script 727.

In many embodiments, streaming engine 711 can handle the transactions data as they are received across the system from the users. For example, a Kafka streaming engine can be used to capture real-time customer data in real-time and store the data in a data store 721, such as a Hadoop-based distributed file system. For offline model training, task engine 722 can construct training examples by extracting features from feature store 723, such as through using Hive or Spark jobs. The training examples can be input into offline deep learning model 724, which can be trained offline on a GPU cluster, for example, to generate user embeddings 725 and dual-item embeddings, which can be used to construct an ANN index in trained model 726. User embeddings 725 can be stored by cache data script loader 727 in embedding lookup cache 714, such as a distributed cache, to facilitate online retrieval by real-time inference engine 713. For example, real-time inference engine 713 can call embedding lookup cache 714 using a user identifier to obtain the user embedding for the user and/or the query vector for the user.

In many embodiments, real-time inference engine 713 can provide personalized recommendations, while providing high throughput and a low-latency experience to the user. In several embodiments, real-time inference engine 713 can utilize the ANN index in trained model 726, constructed from the trained embeddings, and deployed as a microservice. In a number of embodiments, real-time inference engine 713 can interact with front-end client 712, which can be similar to web server 320 (FIG. 3) to obtain user and basket context and generates personalized within-basket recommendations in real-time. In some embodiments, the offline training can be performed periodically, such as weekly, or at another suitable interval, to handle new past-purchase transaction data to update the model.

The model described above for system 700 was evaluated to determine latency performance with various ANN indexing libraries. For parameter settings in the model, an embedding size of 64 was used, along with the Adam Optimizer with an initial learning rate of 1.0, and the noise-contrastive estimation (NCE) of softmax as the loss function. A batch size of 1000 and a maximum of 100 epochs was used to train the model. 200 million triplets were used to train the dataset.

Figure 8:
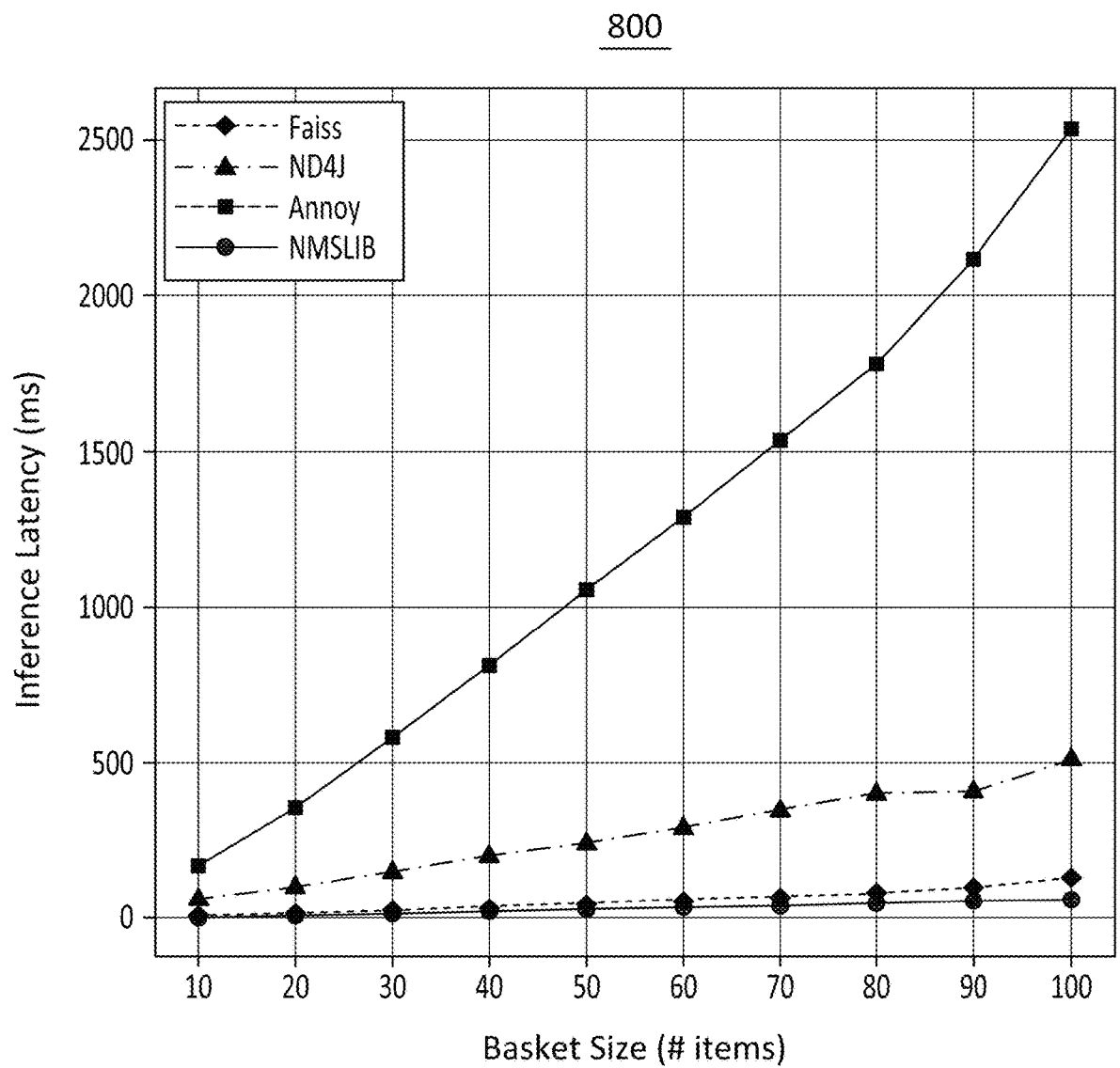
FIG. 8 illustrates a graph showing inference latency (in milliseconds (ms)) versus basket size (in number of basket items)

The real-time latency of system 700 was tested using exact inference and approximate inference methods as described above. Turning ahead in the drawings, FIG. 8 illustrates a graph 800 showing inference latency (in milliseconds (ms)) versus basket size (in number of basket items). ND4J was used to perform exact inference based the following argmax approach:

$$\underset{i}{\operatorname{argmax}}([\begin{array}{cccc} p_i & p_i & q_i & q_i \end{array}]^T [\begin{array}{cccc} q_j & h_u & p_j & h_u \end{array}])$$

Approximate inferencing also was tested using the Faiss, Annoy, and NMSLIB libraries. ND4J is a highly-optimized scientific computing library for the Java Virtual Machine (JVM). Faiss is used for efficient similarity search of dense vectors that can scale to billions of embeddings. Annoy is an ANN library optimized for memory usage and loading/saving to disk. NMSLIB is a similarity search library for generic nonmetric spaces.

As shown in FIG. 8, on average, ND4J adds 186.5 ms of latency when performing exact real-time inference. For approximate inference, Faiss, Annoy, and NMSLIB libraries add an additional 29.3 ms, 538.7 ms, and 16.07 ms of system latency respectively. Faiss and NMSLIB provide an option to perform batch queries on the index, therefore latency is much lower than Annoy. Faiss and NMSLIB are 6-10 times faster than the exact inference method using ND4J. In many embodiments, the real-time user-personalized within-basket recommendation system can serve personalized item recommendations at large-scale with low latency.

Figure 9:
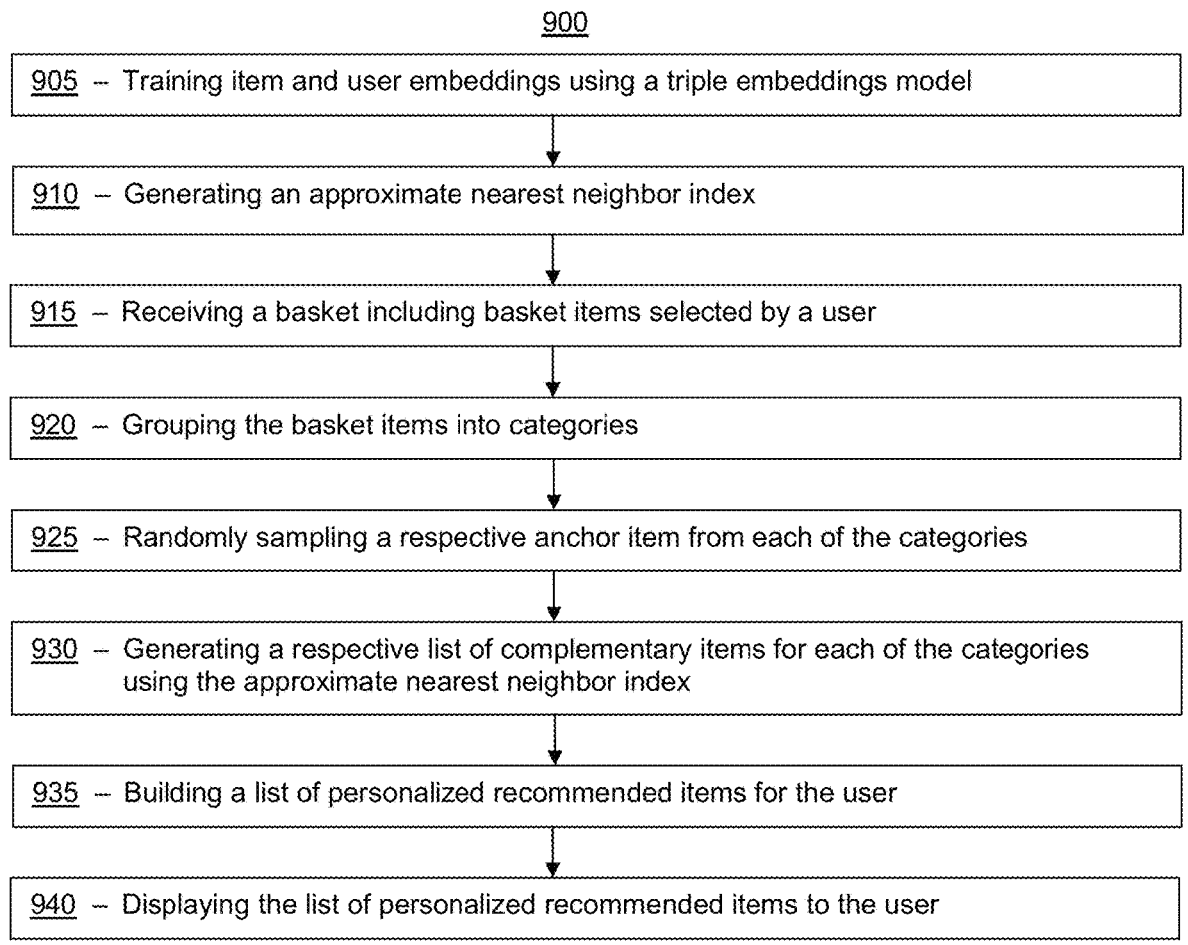
FIG. 9 illustrates a flow chart for a method, according to another embodiment.

Turning ahead in the drawings, FIG. 9 illustrates a flow chart for a method 900, according to another embodiment. In some embodiments, method 900 can be a method of providing personalized recommendations through large-scale deep-embedding architecture. Method 900 is merely exemplary and is not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. Method 900 can be similar to method 500 (FIG. 5) and/or method 600 (FIG. 6), and various activities of method 900 can be similar or identical to various activities of method 500 (FIG. 5) and/or method 600 (FIG. 6).

In many embodiments, system 300 (FIG. 3), personalized recommendation system 310 (FIG. 3), and/or web server 320 (FIG. 3) can be suitable to perform method 900 and/or one or more of the activities of method 900. In these or other embodiments, one or more of the activities of method 900 can be implemented as one or more computing instructions configured to run at one or more processors and configured to be stored at one or more non-transitory computer readable media. Such non-transitory computer readable media can be part of system 300. The processor(s) can be similar or identical to the processor(s) described above with respect to computer system 100 (FIG. 1).

In some embodiments, method 900 and other blocks in method 900 can include using a distributed network including distributed memory architecture to perform the associated activity. This distributed architecture can reduce the impact on the network and system resources to reduce congestion in bottlenecks while still allowing data to be accessible from a central location.

Referring to FIG. 9, method 900 optionally can include a block 905 of training two sets of item embeddings for items in an item catalog and a set of user embeddings for users, using a triple embeddings model, with triplets. In many embodiments, the triple embeddings model can be similar or identical to the triple embeddings model described above, such as triple2vec. In some embodiments, the triple embeddings model can be trained as describe above, based on past purchase history, using triplets. In several embodiments, the triplets each can include a respective first user of the users, a respective first item from the item catalog, and a respective second item from the item catalog, in which the respective first user selected the respective first item and the respective second item in a respective same basket. In other words, each triplet can include (user, first item, second item), in which the first item and the second item were selected (e.g., purchased) in the same basket by the user. Block 905 can be similar or identical to block 605 (FIG. 6). The two set of trained item embeddings can be similar to the item embeddings stored in matrices P and Q, described above. The trained user embeddings for the user can be similar to $h_u$ described above, which can be stored in matrix H, described above. In a number of embodiments, a vector dimension for (i) the trained user embeddings for the user and (ii) for each item in each of the two sets of trained item embeddings can be 128. In other embodiments, a different dimension can be used for the embedding vectors.

In a number of embodiments, method 900 additionally can include a block 910 of generating an approximate nearest neighbor (ANN) index for the two sets of item embeddings. In many embodiments, the ANN index can be similar or identical to the ANN index described above. In various embodiments, the ANN index can be generated and implemented using a conventional similarity search library and/or ANN indexing library, such as Faiss, Annoy, or NMSLIB, as described above. In a number of embodiments, the triple embeddings model and/or the approximate nearest neighbor index can be periodically precomputed using the ANN index library and/or similarity search library. In many embodiments, the training in block 905 and generating the ANN index can be performed in offline deep-learning model 724 (FIG. 7), as described above. The trained model with ANN index can be deployed in real-time inference engine 713 (FIG. 7), and the user embeddings can be deployed in embedding lookup cache 714 (FIG. 7). In many embodiments, the set of user embeddings for the users are loaded into a memory cache, such as embedding lookup cache 714 (FIG. 7), before the respective lookup calls are made.

In several embodiments, method 900 also further include a block 915 of receiving a basket comprising basket items selected by a user from the item catalog. Block 915 can be similar or identical to block 510 (FIG. 5) and/or block 610 (FIG. 6).

The user can be similar or identical to user 350 (FIG. 3). As described above, the basket can include items that have been selected by the user for purchase, referred to as "basket items." For example, the user can select a number of items in an online grocery shopping system, and can initiate a checkout process. In many embodiments, the basket can be received in block 915, such as from a call to real-time inference engine 713 (FIG. 7) from front-end client 712 (FIG. 7) that includes information about the user and the basket.

In a number of embodiments, method 900 additionally can include a block 920 of grouping the basket items of the basket into categories based on a respective item category of each of the basket items. In many embodiments, the item categories can be one of the categorization levels in an item taxonomy, such as the item taxonomy described above. For example, the item categories can be L3 categories, as described above. In various embodiments, each of the categories can be a group in which each of the items in the group has the same item category. Block 920 can be similar or identical to block 615 (FIG. 6).

In several embodiments, method 900 further can include a block 925 of randomly sampling a respective anchor item from each of the categories. In many embodiments, the anchor item can be one of the basket items in the category, chosen at random. For example, in a first category in which there are three basket items, the anchor item can be one of the three basket items, randomly selected. The random sampling of anchor items can be performed for each of the categories created in block 915. Block 925 can be similar or identical to block 620 (FIG. 6). Blocks 920 and 925 together can be similar to block 520 (FIG. 5).

In a number of embodiments, method 900 additionally can include a block 930 of generating a respective list of complementary items for the respective anchor item for the each of the categories based on a respective lookup call to the approximate nearest neighbor index using a query vector associated with the user and the respective anchor item. Block 925 can be similar to group of blocks 530 (FIG. 5) and/or block 625 (FIG. 6), but can involve an approximate inferencing approach using the ANN index. The items in the list of complementary items can be a top k items based on the given anchor item and the user, as described above. The query vector can be similar or identical to the query vector described above. In many embodiments, the query vector can be generated for the user and the respective anchor item using the two sets of item embeddings and the set of user embeddings. In many embodiments, the list of complementary items can be generated in block 930 for each category using real-time inference engine 713 (FIG. 7), as described above. In a number of embodiments, the respective lookup calls to the approximately nearest neighbor index can be made in parallel across the categories, similarly as shown in group of blocks 530 (FIG. 5) and described above.

In several embodiments, method 900 further can include a block 935 of building a list of personalized recommended items for the user based on the respective lists of the complementary items for the categories. In many embodiments, the lists of complementary items for the categories that were generated in block 930 can be used to build the list of personalized recommended items for the user. In several embodiments, block 935 can be similar or identical to block 630 (FIG. 6), and can include one or more of blocks 635, 640, 645, 650, 655, and/or 660 (FIG. 6).

In a number of embodiments, method 900 additionally can include a block 940 of sending instructions to display at least a portion of the list of personalized recommended items to the user. As an example, the display can occur on a user interface of an electronic device. In some embodiments, the entire list of personalized recommended items can be displayed to the user, either all at once or in portions, such as in carousels that are presented round robin to display the entire list in segments. In other embodiments, only a portion of the list of personalized recommended items can be displayed to the user. For example, the top 10 items in the list can be displayed to the user, although the list can include more items, such as 40 items. In many embodiments, the list of personalized recommended items or portion thereof can be displayed on a stock-up page that is presented to the user once the user initiates a checkout process. The list of personalized recommended items can include items that are complementary to the items already in the basket and personalized to be compatible with the preferences of the user, as learned through the triple embeddings model.

Returning to FIG. 3, in several embodiments, communication system 311 can at least partially perform block 510 (FIG. 5) of receiving a basket for a user; block 560 (FIG. 5) of outputting a list of item recommendations for the basket; block 610 (FIG. 6) of receiving a basket comprising basket items selected by a user from an item catalog; and/or block 915 (FIG. 9) of receiving a basket comprising basket items selected by a user from the item catalog.

In several embodiments, item-to-item system 312 can at least partially perform group of blocks 530 (FIG. 5) of generating complementary item recommendations; block 625 (FIG. 6) of generating a respective list of complementary items for the respective anchor item for the each of the categories based on a score for each of the complementary items generated using two sets of trained item embeddings for items in the item catalog and using trained user embeddings for the user; and/or block 930 (FIG. 9) of generating a respective list of complementary items for the respective anchor item for the each of the categories based on a respective lookup call to the approximate nearest neighbor index using a query vector associated with the user and the respective anchor item.

In a number of embodiments, basket-to-item system 313 can at least partially perform block 520 (FIG. 5) of sampling one item per category; block 615 (FIG. 6) of grouping the basket items of the basket into categories based on a respective item category of each of the basket items; block 620 (FIG. 6) of randomly sampling a respective anchor item from each of the categories; block 920 (FIG. 9) of grouping the basket items of the basket into categories based on a respective item category of each of the basket items; and/or block 925 (FIG. 9) of randomly sampling a respective anchor item from each of the categories.

In several embodiments, triple embeddings system 314 can at least partially perform block 605 (FIG. 6) of training a triple embeddings model with triplets using an adaptive moment estimation optimizer to optimize a co-occurrence log-likelihood of each of the triplets; and/or block 905 (FIG. 9) of training two sets of item embeddings for items in an item catalog and a set of user embeddings for users, using a triple embeddings model, with triplets.

In several embodiments, post-processing system 315 can at least partially perform group of blocks 540 (FIG. 5) of performing a complementary category filtering; block 550 (FIG. 5) of performing a weighted sampling; block 630 (FIG. 6) of building a list of personalized recommended items for the user based on the respective lists of the complementary items for the categories; block 635 (FIG. 6) of filtering the respective list of the complementary items for the each of the categories based on complementary subcategories; block 640 (FIG. 6) of performing a weighted sampling of the respective list of the complementary items for the each of the categories to generate a sampled sub-list of the list of the complementary items for the each of the categories; block 645 (FIG. 6) of merging the sampled sub-lists for the categories to generate a unified list; block 650 (FIG. 6) of filtering out items from the unified list having subcategories that are identical to subcategories of the basket items; block 655 (FIG. 6) of sorting each item in the unified list by the score of the item; block 660 (FIG. 6) of performing a category diversification across the unified list; and/or block 935 (FIG. 9) of building a list of personalized recommended items for the user based on the respective lists of the complementary items for the categories.

In a number of embodiments, ANN index system 316 can at least partially perform block 910 (FIG. 9) of generating an approximate nearest neighbor (ANN) index for the two sets of item embeddings; and/or block 930 (FIG. 9) of generating a respective list of complementary items for the respective anchor item for the each of the categories based on a respective lookup call to the approximate nearest neighbor index using a query vector associated with the user and the respective anchor item.

In a number of embodiments, web server 320 can at least partially perform block 510 (FIG. 5) of receiving a basket for a user; block 560 (FIG. 5) of outputting a list of item recommendations for the basket; block 610 (FIG. 6) of receiving a basket comprising basket items selected by a user from an item catalog; block 665 (FIG. 6) of sending instructions to display at least a portion of the list of personalized recommended items to the user; and/or block 940 (FIG. 9) of sending instructions to display at least a portion of the list of personalized recommended items to the user.

In many embodiments, the techniques described herein can provide a practical application and several technological improvements. Specifically, the techniques described herein can provide for automatically providing personalized recommendations through large-scale deep-embedding architecture, which can provide more relevant item recommendations that are compatible with the preferences of the user and complementary with the items in the basket. In a number of embodiments, the techniques described herein can use a novel machine-learning approach that can learn features that can represent complementarity between items and/or compatibility between users and items, which can be used to provide more relevant personalized recommendations for a user based on the items that the user has selected in the basket. In many embodiments, this model can be implemented with an approximate inference technique to lower the latency and provide the item recommendations in real-time, which can be scaled to serve millions of online users. In a number of embodiments, the techniques described herein can solve a technical problem that cannot be solved outside the context of computer networks. For example, the machine learning models described here cannot be implemented outside the context of computer networks.

Various embodiments can include a system including one or more processors and one or more non-transitory computer-readable media storing computing instructions configured to run on the one or more processors and perform certain acts. The acts can include receiving a basket including basket items selected by a user from an item catalog. The acts also can include grouping the basket items of the basket into categories based on a respective item category of each of the basket items. The acts additionally can include randomly sampling a respective anchor item from each of the categories. The acts further can include generating a respective list of complementary items for the respective anchor item for the each of the categories based on a respective score for each of the complementary items generated using two sets of trained item embeddings for items in the item catalog and using trained user embeddings for the user. The two sets of trained item embeddings and the trained user embeddings can be trained using a triple embeddings model with triplets. The triplets each can include a respective first user of users, a respective first item from the item catalog, and a respective second item from the item catalog, in which the respective first user selected the respective first item and the respective second item in a respective same basket. The acts additionally can include building a list of personalized recommended items for the user based on the respective lists of the complementary items for the categories. The acts further can include sending instructions to display, to the user on a user interface of a user device, at least a portion of the list of personalized recommended items.

A number of embodiments can include a method being implemented via execution of computing instructions configured to run at one or more processors and stored at one or more non-transitory computer-readable media. The method can include receiving a basket including basket items selected by a user from an item catalog. The method also can include grouping the basket items of the basket into categories based on a respective item category of each of the basket items. The method additionally can include randomly sampling a respective anchor item from each of the categories. The method further can include generating a respective list of complementary items for the respective anchor item for the each of the categories based on a respective score for each of the complementary items generated using two sets of trained item embeddings for items in the item catalog and using trained user embeddings for the user. The two sets of trained item embeddings and the trained user embeddings can be trained using a triple embeddings model with triplets. The triplets each can include a respective first user of users, a respective first item from the item catalog, and a respective second item from the item catalog, in which the respective first user selected the respective first item and the respective second item in a respective same basket. The method additionally can include building a list of personalized recommended items for the user based on the respective lists of the complementary items for the categories. The method further can include sending instructions to display, to the user on a user interface of a user device, at least a portion of the list of personalized recommended items.

Various embodiments can include a system including one or more processors and one or more non-transitory computer-readable media storing computing instructions configured to run on the one or more processors and perform certain acts. The acts can include training two sets of item embeddings for items in an item catalog and a set of user embeddings for users, using a triple embeddings model, with triplets. The triplets each can include a respective first user of the users, a respective first item from the item catalog, and a respective second item from the item catalog, in which the respective first user selected the respective first item and the respective second item in a respective same basket. The acts also can include generating an approximate nearest neighbor index for the two sets of item embeddings. The acts additionally can include receiving a basket including basket items selected by a user from the item catalog. The acts further can include grouping the basket items of the basket into categories based on a respective item category of each of the basket items. The acts additionally can include randomly sampling a respective anchor item from each of the categories. The acts further can include generating a respective list of complementary items for the respective anchor item for the each of the categories based on a respective lookup call to the approximate nearest neighbor index using a query vector associated with the user and the respective anchor item. The acts additionally can include building a list of personalized recommended items for the user based on the respective lists of the complementary items for the categories. The acts further can include sending instructions to display, to the user on a user interface of a user device, at least a portion of the list of personalized recommended items.

A number of embodiments can include a method being implemented via execution of computing instructions configured to run at one or more processors and stored at one or more non-transitory computer-readable media. The method can include training two sets of item embeddings for items in an item catalog and a set of user embeddings for users, using a triple embeddings model, with triplets. The triplets each can include a respective first user of the users, a respective first item from the item catalog, and a respective second item from the item catalog, in which the respective first user selected the respective first item and the respective second item in a respective same basket. The method also can include generating an approximate nearest neighbor index for the two sets of item embeddings. The method additionally can include receiving a basket including basket items selected by a user from the item catalog. The method further can include grouping the basket items of the basket into categories based on a respective item category of each of the basket items. The method additionally can include randomly sampling a respective anchor item from each of the categories. The method further can include generating a respective list of complementary items for the respective anchor item for the each of the categories based on a respective lookup call to the approximate nearest neighbor index using a query vector associated with the user and the respective anchor item. The method additionally can include building a list of personalized recommended items for the user based on the respective lists of the complementary items for the categories. The method further can include sending instructions to display, to the user on a user interface of a user device, at least a portion of the list of personalized recommended items.

Additional embodiments can include a system including one or more processors and one or more non-transitory computer-readable media storing computing instructions configured to run on the one or more processors and perform certain acts. The acts can include training two sets of item embeddings for items in an item catalog and a set of user embeddings for users, using a triple embeddings model, with triplets. The triplets each include a respective first user of the users, a respective first item from the item catalog, and a respective second item from the item catalog, in which the respective first user selected the respective first item and the respective second item in a respective same basket. The acts also can include randomly sampling an anchor item from a category of items selected by a user. The acts additionally can include generating a list of complementary items using a query vector associated with the user and the anchor item. The query vector is generated for the user and the anchor item using the two sets of item embeddings and the set of user embeddings.

Further embodiments can include a method being implemented via execution of computing instructions configured to run at one or more processors and stored at one or more non-transitory computer-readable media. The method can include training two sets of item embeddings for items in an item catalog and a set of user embeddings for users, using a triple embeddings model, with triplets. The triplets each include a respective first user of the users, a respective first item from the item catalog, and a respective second item from the item catalog, in which the respective first user selected the respective first item and the respective second item in a respective same basket. The method also can include randomly sampling an anchor item from a category of items selected by a user. The method additionally can include generating a list of complementary items using a query vector associated with the user and the anchor item. The query vector is generated for the user and the anchor item using the two sets of item embeddings and the set of user embeddings.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although providing personalized recommendations through large-scale deep-embedding architecture has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities of FIG. 5, 6 or 9 may include different procedures, processes, and/or activities and be performed by many different modules, in many different orders. As another example, one or more of the procedures, processes, and/or activities of one of FIG. 5, 6 or 9 can be performed in another one of FIG. 5, 6 or 9. As another example, the systems within system 300 in FIG. 3 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform:
      training two sets of item embeddings for items in an item catalog and a set of user embeddings for users, using a triple embeddings model, with triplets, wherein the triplets each comprise a respective first user of the users, a respective first item from the item catalog, and a respective second item from the item catalog, in which the respective first user selected the respective first item and the respective second item in a respective same basket;
      randomly sampling an anchor item from a category of items selected by a user; and
      generating a list of complementary items using a query vector associated with the user and the anchor item, wherein the query vector is generated for the user and the anchor item using the two sets of item embeddings and the set of user embeddings.

2. The system of claim 1, wherein the query vector is generated for the user and the anchor item using the two sets of item embeddings and the set of user embeddings.

3. The system of claim 1, wherein generating the list of complementary items further comprises using an approximate nearest neighbor index that is periodically precomputed using a similarity search library.

4. The system of claim 1, wherein generating the list of complementary items further comprises making a lookup call to an approximate nearest neighbor index.

5. The system of claim 4, wherein the set of user embeddings are loaded into a memory cache before the lookup call is made.

6. The system of claim 1, wherein the computing instructions are further configured to perform:
   building a list of personalized recommended items for the user based at least in part on the list of complementary items.

7. The system of claim 6, wherein building the list of personalized recommended items further comprises:
   filtering the list of the complementary items based on complementary subcategories; and
   performing a weighted sampling of the list of the complementary items to generate a sampled sub-list of the list of the complementary items.

8. The system of claim 7, wherein performing the weighted sampling of the list of the complementary items comprises:
   sampling a quantity of items from the list of the complementary items proportional to a quantity of basket items in the category with respect to a total quantity of the basket items.

9. The system of claim 6, wherein:
   at least a portion of the list of personalized recommended items is displayed to the user on a checkout page; and
   the checkout page appears on a user interface of a user device of the user.

10. The system of claim 1, wherein the triple embeddings model is trained with the triplets using an adaptive moment estimation optimizer to optimize a co-occurrence log-likelihood of each of the triplets.

11. A method being implemented via execution of computing instructions configured to run at one or more processors and stored at one or more non-transitory computer-readable media, the method comprising:

training two sets of item embeddings for items in an item catalog and a set of user embeddings for users, using a triple embeddings model, with triplets, wherein the triplets each comprise a respective first user of the users, a respective first item from the item catalog, and a respective second item from the item catalog, in which the respective first user selected the respective first item and the respective second item in a respective same basket;

randomly sampling an anchor item from a category of items selected by a user; and generating a list of complementary items using a query vector associated with the user and the anchor item, wherein the query vector is generated for the user and the anchor item using the two sets of item embeddings and the set of user embeddings.

12. The method of claim 11, wherein the query vector is generated for the user and the anchor item using the two sets of item embeddings and the set of user embeddings.

13. The method of claim 11, wherein generating the list of complementary items further comprises using an approximate nearest neighbor index that is periodically precomputed using a similarity search library.

14. The method of claim 11, wherein generating the list of complementary items further comprises making a lookup call to an approximate nearest neighbor index.

15. The method of claim 14, wherein the set of user embeddings are loaded into a memory cache before the lookup call is made.

16. The method of claim 11 further comprising:

building a list of personalized recommended items for the user based at least in part on the list of complementary items.

17. The method of claim 16, wherein building the list of personalized recommended items further comprises:

filtering the list of the complementary items based on complementary subcategories; and performing a weighted sampling of the list of the complementary items to generate a sampled sub-list of the list of the complementary items.

18. The method of claim 17, wherein performing the weighted sampling of the list of the complementary items comprises:

sampling a quantity of items from the list of the complementary items proportional to a quantity of basket items in the category with respect to a total quantity of the basket items.

19. The method of claim 16, wherein:

at least a portion of the list of personalized recommended items is displayed to the user on a checkout page; and the checkout page appears on a user interface of a user device of the user.

20. The method of claim 11, wherein the triple embeddings model is trained with the triplets using an adaptive moment estimation optimizer to optimize a co-occurrence log-likelihood of each of the triplets.

* * * * *